(Model.)
A. M. SWAIN.
TURBINE WATER WHEEL.
No. 535,467. 3 Sheets—Sheet 1.
Patented Mar. 12, 1895.
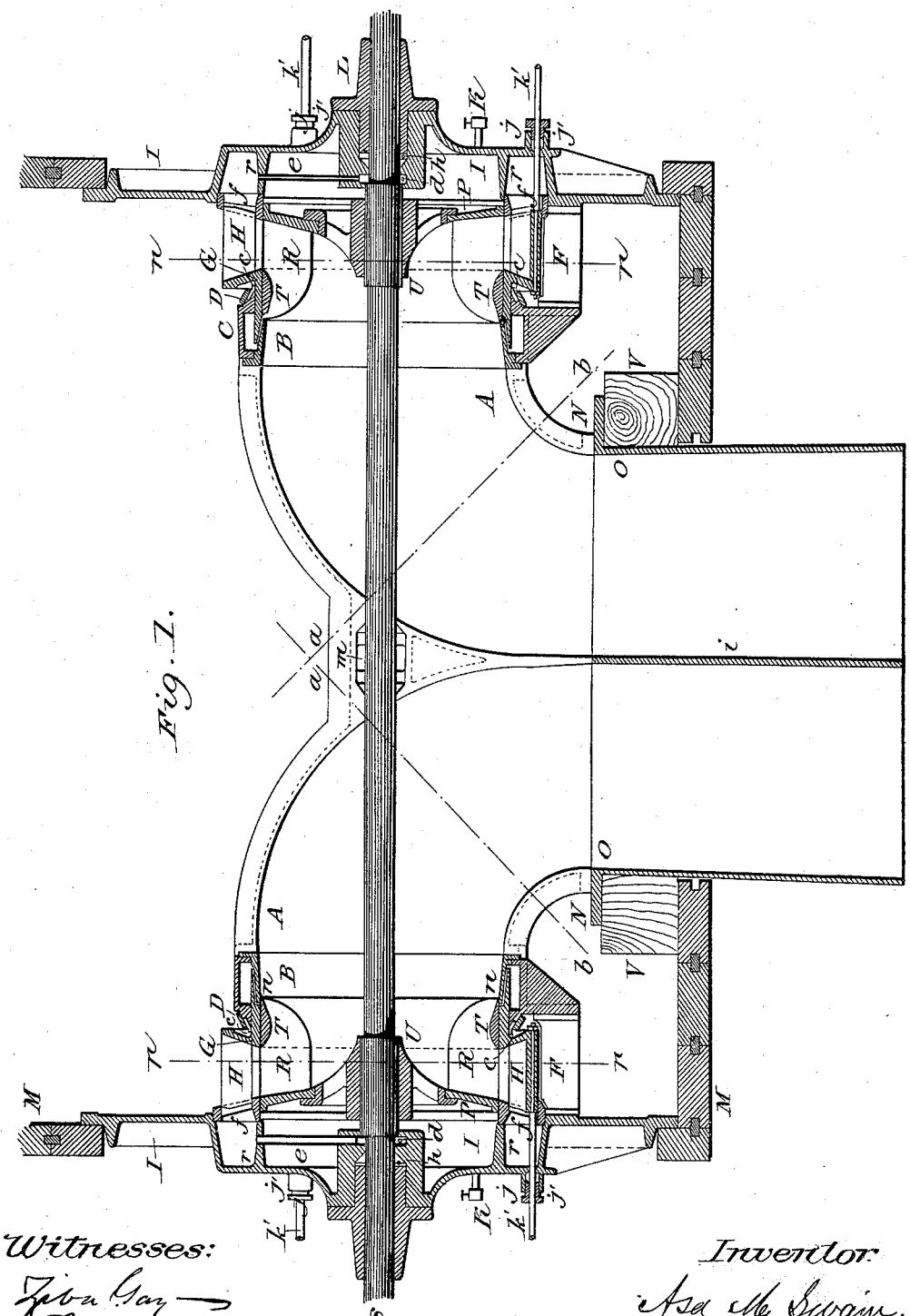
Fig. I.
Witnesses:
Inventor:
Asa M. Swain.

(Model.)
A. M. SWAIN.
TURBINE WATER WHEEL.
No. 535,467.
3 Sheets—Sheet 2.
Patented Mar. 12, 1895.
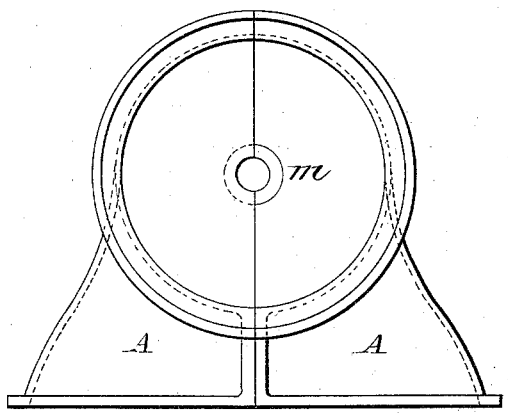
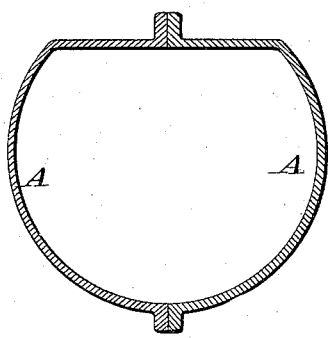
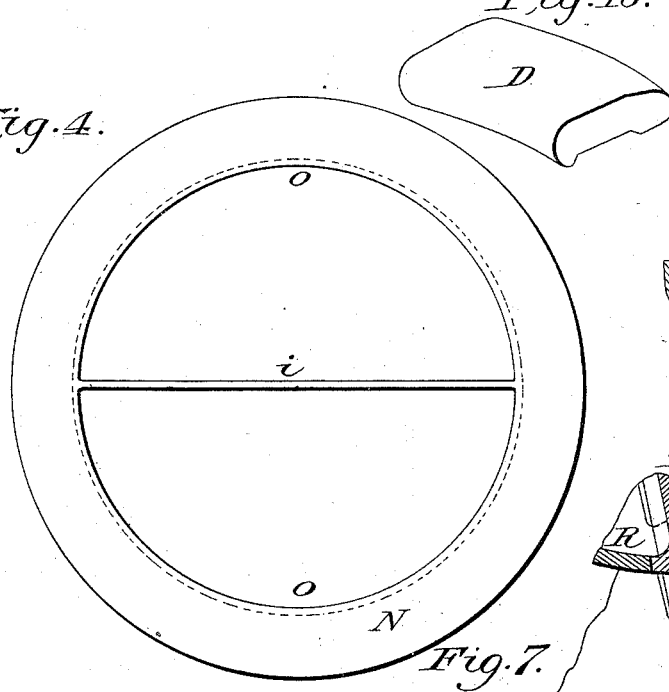
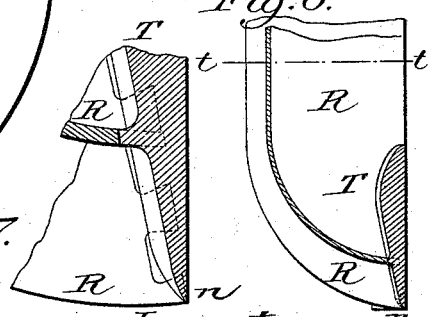
Witnesses:
Inventor:
Asa M. Swain.

(Model.) A. M. SWAIN. 3 Sheets—Sheet 3.
TURBINE WATER WHEEL.

No. 535,467. Patented Mar. 12, 1895.

Witnesses: Inventor:
Asa M. Swain.

UNITED STATES PATENT OFFICE.

ASA M. SWAIN, OF TYNGSBOROUGH, MASSACHUSETTS.

TURBINE WATER-WHEEL.

SPECIFICATION forming part of Letters Patent No. 535,467, dated March 12, 1895.

Application filed January 10, 1881. Serial No. 23,671. (Model.)

*To all whom it may concern:*

Be it known that I, ASA M. SWAIN, of Tyngsborough, county of Middlesex, and State of Massachusetts, have invented certain new and useful Improvements in Turbine Water-Wheels; and I hereby declare the following to be a full, clear, and exact description of the same, reference being made to the accompanying drawings, forming a part of this specification.

My invention relates, chiefly, to turbines with a horizontal axis, called vertical turbines; the object of which is an increased capacity in the same diameter, at the same cost, a more convenient arrangement of packing around the gates, and the journal bearings, an improved form of discharge and draft pipe, and the control of a column of air, or water, in the same, at the pleasure of the operator.

Figure 8:
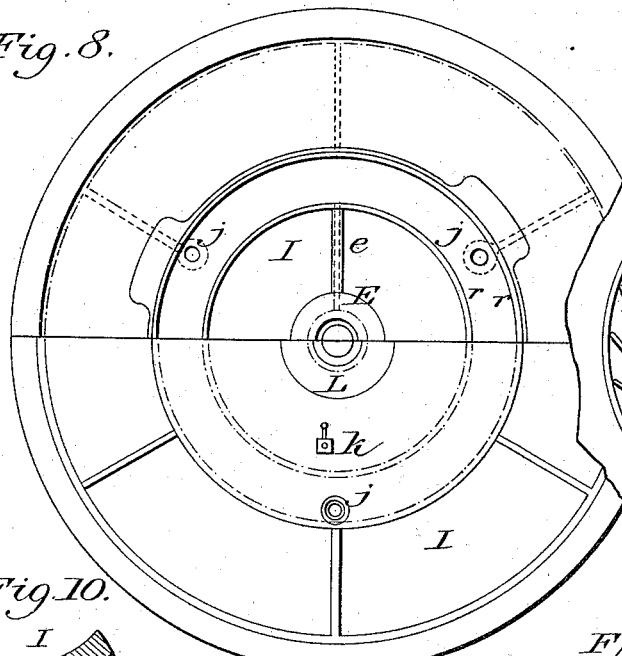
Figure 9:
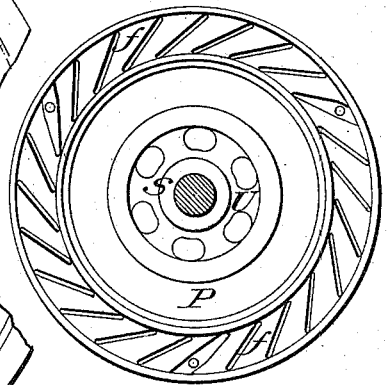
Figure 10:
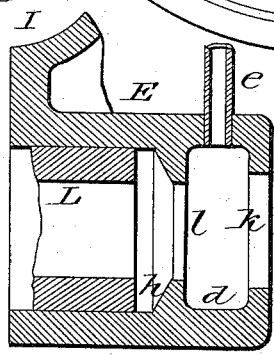
Figure 11:
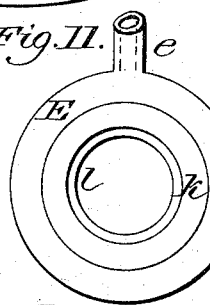
Figure 12:
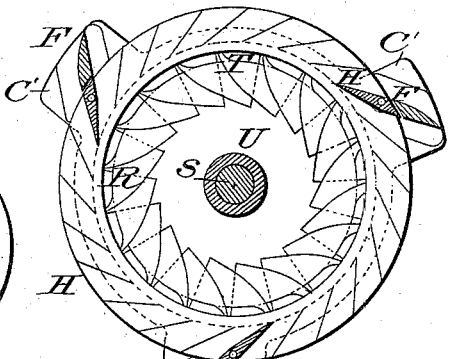
Figures 13, 14:
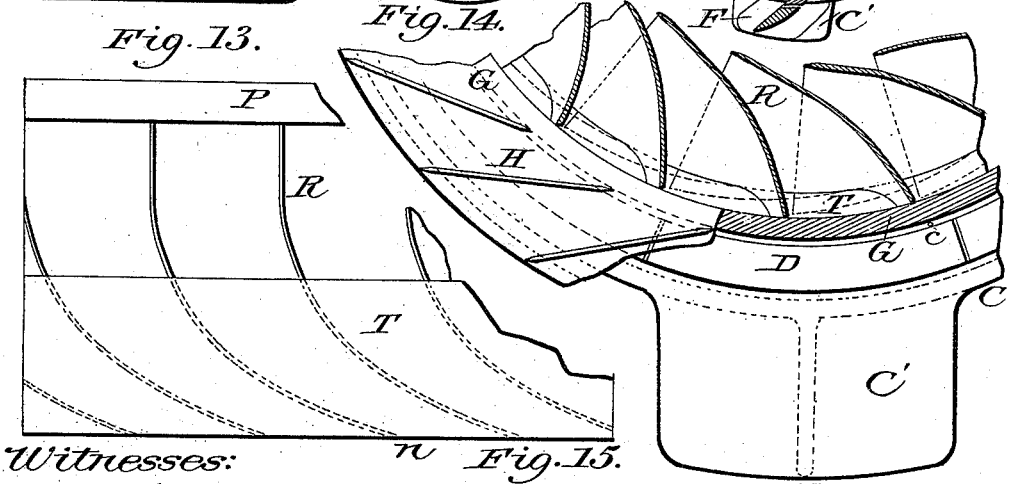
Figure 15:

In the drawings, Figure 1, is a vertical longitudinal section of a double turbine as arranged in actual use embodying my invention. Fig. 2 is an end view of the double discharge quarter turn A, A, of Fig. 1. Fig. 3 is a section of the double quarter turn or dotted lines $a$, $b$, of Fig. 1. Fig. 4 is a plan on the double draft pipe O, O, of Fig. 1. Fig. 5 is an enlarged section of a portion of the gate and its packing arrangement. Figs. 6 and 7 are enlarged sections of the band T, of the wheel, with a portion of the connected floats in outline. Fig. 8 is an elevation of the head I; the upper half of the figure showing the inside, the lower half the outside. Fig. 9 is an elevation of the slotted plate $f, f$, the wheel crown P, with its hub U, and the shaft S, in cross section. Fig. 10 is an enlarged vertical section of one of the hubs E, a part of the water pipe $e$, a portion of the head I, a part of which they are, and a part of the journaled bearing L, which supports the wheel shaft S. Fig. 11 is an inside end view of one of the said hubs. Fig. 12 is a vertical cross section through the wheel, essentially the crown P, floats R, and band T, gate G, and supporting, or guide stands, F, on the broken line $p, p$, of Fig. 1. Fig. 13 is an enlarged development of the outer circumference of the wheel. Fig. 14 is an enlarged elevation of the lower portion of the gate G, with its guides H, gate curb C, with its projecting stand seat C', the leather packing $c$, and its holding segments D. In the same figure is shown a section of a portion of the cylindrical part of the gate G, on the broken line $q, q$, Fig. 5, and also a portion of the wheel on line $t, t$, Fig. 6. Fig. 15 is an enlarged section of the gate curb C, flaring curb B, with portions of the gate G, and the double quarter turn A. Fig. 16 is a perspective view of one end of the segment D.

Like letters refer to like parts in all of the figures.

The shaft S, which is shown as broken off at each end, illustrates the main shaft of a mill and the wheels can be mounted thereon as shown when the relation of the mill and the stream will permit it. It is often necessary however to locate the wheels below the main shaft of the mill to get the full benefit of the fall, in which case the wheels may be connected to the mill in any of the well known ways of transmitting power.

The construction of the shafts and the location of the wheels on the main shaft are no part of my invention. A great variety of ways may be employed for connecting the wheels to the mill, but these do not alter in any essential respect the construction and operation of the invention itself.

Fig. 1 shows a pair of wheels, P being the crown, R the float and T a band connecting all of the floats, arranged upon a horizontal shaft S, each receiving its induction water tangentially in a plane perpendicular to their axis of rotation and each discharging its effluent water through a short flaring curb B, into the double quarter turn A, A, with an easy downward curve and a constantly increasing cross sectional area until it meets the vertical draft pipe O, O.

It will be seen that the section of the effluent water just as it enters the quarter turns at A, A, is bounded by a circle as shown in Fig. 2. In Fig. 3 is shown the section of the discharging streams when they have reached an angle of forty-five degrees, or the dotted lines $a, b$, Fig. 1. In Fig. 4 is shown the form of said discharging streams where they enter the double draft pipe O, O, with its partition $i$, extending into the water of the lower level; each stream having a compartment of its own, and changing its form from that of a circle on entering at A, to a half circle as it enters the draft pipe at O.

I am aware that double vertical turbines have been made discharging toward each other into a common receptacle but without any partition, or depression, curved, or otherwise, to break the direct action of one stream against the other, thereby causing serious loss of efficiency, this defect being completely remedied by my partition extending downward and forming a continuation of the double quarter turn A, A, in the educt. It is obvious that this partition may be shortened or lengthened in the educt at the pleasure of the constructer; but it should be remembered that when it is made quite short it will develop its full utility only when both wheels are being operated above one half of their full capacity. Any partition however short or any construction of the interior of the educt which breaks or checks the action of one stream against the other, is within the spirit of my invention. The extent of the partition is simply a matter of degree in the application of the invention.

The draft pipe O, has a wide flange N, which rests upon a timber clamp, in the bottom of the wooden flume M, M, Fig. 1. A cast iron head I, is fixed in each side of the flume, carrying on the outside the journal boxes L, at the inner end of which, and in that part of the hub E, projecting inward is a stuffing chamber $h$, and still farther in, the annular water chamber $d$, supplied by the pipe $e$, having communication with the head water of the flume M, through the annular guide chamber and the slotted plate, $f f$. These hubs, E, E, are bored to fit the shaft, S, at $l$ and $k$, and the box L. Annular ribs $r$, $r$, project on the inside so as to form, with the slotted plate $f$, $f$, an annular guide chamber into which project the guides H, H, of the gate G, when shut. In each head is an air cock K, having communication with the educt A, O, for the purpose of filling that educt with air, when the water on that side is shut off from the wheel; that on the other side being in operation.

My gate consists essentially of a flanged cylinder, usually of cast iron from the flange of which project twenty-four guides H, H. Three of these are cast solid with the flange and of sufficient thickness for rods $k'$, $k'$, to pass through, by means of which, with any suitable mechanism, to operate the said gate. The other twenty-one guides are usually made of sheet metal of suitable thickness, with thinned edges as is clearly shown in Fig. 14. The edges attached to the flange may be made similar in form to the edges of the floats, hereinafter described, and shown in Figs. 6 and 7; the said edges projecting into the mold of the flange sufficiently for the molten metal to flow and close firmly upon them.

The cylindrical part of the gate, G, slides into a curb C, which carries on a conical annular projection around that part of the gate, a packing made up of six, or more, leather segments $c$, and held in place by segments D, of cast iron, corresponding in number with the leather segments, or not, as the builder may elect, and suitable tap bolts projecting in nearly a radial direction as is clearly shown by the enlarged section Fig. 5. The leather segments $c$, it will be seen, lie in a rabbet of equal thickness with the leather. The cast iron segments D, are hollowed out on the under side so as to effectually hold the leather segments by one edge of the hollowed side while the other edge rests against the gate curb C.

It will be readily seen that the segment D, might be so much hollowed out, or rabbeted, as to avoid the necessity of any rabbet in the gate curb C. I prefer the form shown in the drawings.

Two or three turns of the screws will so loosen the segments that the packing may be easily removed and replaced by new. Heretofore it has been customary to pass the screws through the leather segments and thus every screw must be entirely withdrawn in order to replace the leather packing. The gates G, are operated by any suitable mechanism heretofore in use, fixed on the outside of the heads I, and connecting with the gate by suitable rods $k'$, $k'$, passing through stuffing boxes in said heads, projections for which are shown at $j$, $j$, with glands, or plungers $j'$, $j'$, Figs. 1 and 8.

My wheel consists of the crown P, floats R, band T, and the hub U, fixed on the shaft S, Figs. 1, 9 and 12. The floats R, are of such form as is adapted to receive the water in a tangential direction, the plane of motion being perpendicular to their axes of rotation, at their outer edges through the chutes, or guide plates H, H, of the gate G, Figs. 12, 13 and 14, and discharging it, a portion toward the axis, a portion parallel with the axis, the other portions at intermediate angles, each in proportion as there is escape area to discharge into. It will be obvious that with this arrangement of induct and educt there can be no possible end thrust of one wheel not counterbalanced by the end thrust of the other wheel.

The wheel may be cast in one piece. The floats may be cast, each by itself, then set up in a proper mold and the crown and band cast on.

Bands of several kinds have been made for inward flow turbines and attached in many ways, and have, heretofore, been of considerable thickness in order to be of sufficient strength, or to get a sufficient hold upon the floats to hold them firmly and permanently at their proper distances from each other.

By making the edge $n$, of the band T, Fig. 6, as there shown where it meets the discharge edge of the float R, at a radial distance from the axis equal to the radius of the greatest circumference of the wheel, a greater area of discharge is obtained, thereby increasing the capacity of the turbine without increasing its diameter or impairing its efficiency. In order to give sufficient hold on the floats by so thin a band I cut dovetails in this edge of the float, of a greater depth than the band has thickness, as is shown in the drawings. When the band is cast the molten metal fills these dovetails and prevents the floats from being pulled from the band by accident or otherwise. To facilitate the flowing of the metal into the dovetails and further stiffen the floats a small corner is taken from the sand mold against each side of the float as shown in Fig 7, being of the full size for a turbine twenty-four inches in diameter. The edges of the floats attached to the crown may be of similar form, but what is quite as well, or better in this particular case, a row of holes may be made near the edge, not much exceeding in diameter the projection of the edges into the crown. The same method is applicable in the preparation of the guide plates, H, before described. By means of this combination the discharge area of the turbine may be made fully equal to its diameter and yet retain the stiffening band sufficient for all purposes.

Wheels have been made without bands. They have the disadvantages of less strength and greater leakage around their outer edges.

One serious difficulty with vertical turbines has been the suction through the journal bearings, taking in large quantities of lubricating material with considerable air; both impairing the efficiency of the draft and cutting the journals rapidly.

My device of the annular water chamber $d$, supplied under the pressure of the whole working head through the pipe $e$, reverses the whole matter, causing a pressure between chambers $d$, and $h$.

The annular space $m$, Figs. 1 and 2 around the shaft S, between the quarter turns is filled with any suitable packing material.

The operation of the apparatus is as follows: The flume M, M, being filled with water, when the gates G, are opened the water impinges upon the floats R, through the guides, or chutes H, H, in a tangential direction, then pressing its way along sets the wheel in motion, being constantly changed in its direction from a tangential one to a vertical and horizontal one; the vertical being changed to a horizontal one immediately after leaving the float by the natural tendency of the water seeking the most direct outlet, assisted by the curved wheel hub U, Fig. 1. The arrangement of the double quarter turn prevents the discharging water from impinging one stream against the other, and which would thus materially retard the velocity of the flow and cause a reaction, or back pressure upon the wheels, thereby reducing the effective pressure upon the floats of the wheels and consequently their efficiency as motors. The separate compartment plan enables the operator to use one turbine or both, or any desirable fraction of one, or both, as occasion, or circumstances may require, with the end thrust in all these conditions in equilibrium. When desirable to use the water all upon one-half of the machine, it is desirable to exhaust the water from the other compartment and fill it with air, which can be done by opening the cock K, in the head I. It will be understood that the unused wheel will run very much easier in air than in water.

It is obvious that other forms of gate may be used with the described wheel, or, other wheels with the described gate, and other forms of both wheel and gate with the described shaft packing, double quarter turn, draft pipe, and other devices, but not with equal increments of efficiency for the different parts, and therefore I prefer those shown in the drawings.

Having thus fully described my invention, what I claim as new, and desire to secure by Letters Patent, is—

1. Two vertical turbine water-wheels in one machine, discharging their effluent water toward each other, combined with a common receptacle into which the water from both wheels is discharged, said receptacle being so constructed on the inside as to form a partition or obstruction therein, located between the wheels, whereby the direction of the stream from each wheel is diverted and its action against the stream of the other wheel is wholly or partially obviated, substantially as described.

2. Two turbine wheels provided with a surrounding flume case and induct passages each wheel discharging its effluent water into a quarter turn A, having its top surface curved outwardly and downwardly from said wheel, said quarter turns being located between the wheels, in combination with said quarter turns A. A. and a draft pipe O, having a vertical partition $i$, throughout its entire length which is practically a continuation of the central walls between the quarter turns, whereby the entire educt is divided into two separate passages, substantially as described.

3. The combination of two turbine wheels provided with a surrounding flume case and induct passages and arranged to discharge the water into a common educt passage located between them and provided with a dividing partition which curves outwardly and downwardly from each wheel substantially as described.

4. The combination of a turbine water-wheel, its surrounding flume case and educt passage, the wheel shaft and its supporting box located in the wall of the educt said box being provided with an annular chamber within it surrounding the shaft, and a suitable water passageway to said chamber, such as the tube $e$, all substantially as described.

5. The combination in a turbine wheel having a sidewise delivery from the floats, of the series of floats surrounding the shaft and an outer band attached to and surrounding the floats, said band having a cylindrical exterior surface fitting closely the educt passage and an inner surface beveled to a thin edge at the points of attachment to the ends of the floats so that its outer delivery edge substantially coincides with the outer diameter of the wheel, whereby the freedom of the delivery of the wheel is increased, substantially as described.

6. The combination of the gate curb C. provided with an annular extension over the cylindrical gate G, and presenting an outer inclined surface approximately parallel therewith, the leather packing c, arranged to rest upon this outer inclined surface and bear upon the gate, the segments D. clamping the leather packing in place and the bolts securing the same to the said annular extension, and arranged to present their heads radially outward, or substantially so, between the gate and the curb, whereby they are made accessible for removing and replacing the packing, substantially as described.

7. Two turbine wheels provided with a surrounding flume case and induct passages, and having a discharge pipe located between the wheels and having a vertical partition therein dividing it into two separate passages, combined with an air inlet passage in one of said passages near its upper end and arranged to be opened when the water is shut off from one wheel, substantially as described.

ASA M. SWAIN.

Witnesses:
NATHAN B. EDWARDS,
S. R. EDWARDS.